(12) United States Patent
Kobayashi et al.

(10) Patent No.: US 8,042,788 B2
(45) Date of Patent: Oct. 25, 2011

(54) VALVE DEVICE FOR FUEL TANK

(75) Inventors: Yoshitaka Kobayashi, Aichi-ken (JP);
Kenichiro Kaneko, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 535 days.

(21) Appl. No.: 11/898,514

(22) Filed: Sep. 13, 2007

(65) Prior Publication Data

US 2008/0067466 A1  Mar. 20, 2008

(30) Foreign Application Priority Data

Sep. 15, 2006  (JP) .................................. 2006-251192

(51) Int. Cl.
*F16K 31/44* (2006.01)

(52) U.S. Cl. ........... 251/83; 251/144; 251/334; 137/592

(58) Field of Classification Search .................. 251/82, 251/83, 144, 333, 334, 339, 356; 137/592, 137/541, 542

See application file for complete search history.

(56) References Cited

U.S. PATENT DOCUMENTS

| | | | | |
|---|---|---|---|---|
| 256,109 | A | * | 4/1882 | Locke ............................ 251/210 |
| 1,818,856 | A | * | 8/1931 | Langdon ......................... 251/50 |
| 1,934,314 | A | * | 11/1933 | Lawier ............................ 251/86 |
| 2,893,685 | A | * | 7/1959 | Van Camp ..................... 251/334 |
| 2,936,779 | A | * | 5/1960 | Kindred .......................... 137/854 |
| 3,620,501 | A | * | 11/1971 | Friedell .......................... 251/333 |
| 3,911,949 | A | * | 10/1975 | Hilden et al. .................... 137/854 |
| 5,638,856 | A | | 6/1997 | Ohsaki |
| 5,660,206 | A | * | 8/1997 | Neal et al. ...................... 137/592 |
| 5,662,142 | A | * | 9/1997 | Ansite ............................ 137/854 |
| 5,735,504 | A | * | 4/1998 | Walters ............................ 251/83 |
| 6,012,599 | A | * | 1/2000 | Miura et al. .................. 220/86.2 |
| 6,026,853 | A | * | 2/2000 | Osterbrink ................. 137/527.4 |
| 6,056,029 | A | * | 5/2000 | Devall et al. .................. 141/383 |
| 6,305,408 | B1 | * | 10/2001 | Goto et al. ..................... 137/351 |
| 6,340,031 | B1 | * | 1/2002 | Matsumoto et al. ........ 137/513.3 |
| 6,470,911 | B2 | * | 10/2002 | Miura et al. ................... 137/592 |
| 6,575,190 | B1 | * | 6/2003 | Rosseel et al. ........... 137/512.15 |

(Continued)

FOREIGN PATENT DOCUMENTS

JP  U-03-34932  4/1991

(Continued)

OTHER PUBLICATIONS

Office Action dated Dec. 12, 2008 in corresponding Chinese patent application No. 200710145500.4 (and English translation).

(Continued)

*Primary Examiner* — John Fristoe, Jr.
*Assistant Examiner* — Marina Tietjen
(74) *Attorney, Agent, or Firm* — Posz Law Group, PLC

(57) ABSTRACT

A thin disk portion, which extends radially, and a rib provided in an outer circumference part of the disk portion are formed in a valve body. A ring-like seal projection to be pressure-contacted with the disk portion to seal a valve is formed in a case. Because the disk portion is thin, deformation occurs along an end surface of a seal projection when the valve is sealed. Even when the seal projection is deformed due to fuel swelling or the like, sealing is enabled along the entire circumference thereof. High sealability is achieved even when the resin components are pressure-contacted with each other.

23 Claims, 8 Drawing Sheets

U.S. PATENT DOCUMENTS

| | | | |
|---|---|---|---|
| 6,837,256 B2 * | 1/2005 | Benjey | 137/15.26 |
| 6,895,998 B2 * | 5/2005 | Aoki et al. | 137/592 |
| 6,959,727 B2 * | 11/2005 | Krishnamoorthy et al. | 137/588 |
| 6,978,801 B2 | 12/2005 | Takahashi | |
| 7,082,964 B1 * | 8/2006 | Yoshizawa et al. | 137/592 |
| 7,100,645 B2 * | 9/2006 | Hasegawa et al. | 141/301 |
| 7,503,343 B2 * | 3/2009 | Krishnamoorthy et al. | 137/588 |
| 2003/0201014 A1 * | 10/2003 | Krishnamoorthy et al. | 137/542 |
| 2004/0050428 A1 * | 3/2004 | Benjey | 137/592 |
| 2005/0028873 A1 * | 2/2005 | Martin et al. | 137/592 |
| 2005/0067027 A1 * | 3/2005 | Kaneko | 137/592 |
| 2006/0037648 A1 * | 2/2006 | Krishnamoorthy et al. | 137/592 |
| 2007/0278440 A1 * | 12/2007 | Hoeptner, III | 251/210 |

FOREIGN PATENT DOCUMENTS

| | | |
|---|---|---|
| JP | A-2000-280764 | 10/2000 |
| JP | A-2004-28043 | 1/2004 |
| JP | A-2006-27595 | 2/2006 |
| JP | A-2006-123576 | 5/2006 |

OTHER PUBLICATIONS

Office Action dated Jan. 21, 2011 in corresponding Japanese patent application No. 2006-251192 (and English translation).

\* cited by examiner

VALVE DEVICE FOR FUEL TANK

BACKGROUND OF THE INVENTION

1. Field of the Invention

The present invention relates to a fuel tank. More specifically, the invention relates to a valve device, such as a backflow prevention valve (or check valve), to be attached to a resin fuel tank.

2. Related Art

Various valve devices, such as a backflow prevention valve, and a valve device for an evaporator circuit, are attached to an automotive fuel tank. In recent years, the resinification of fuel tanks has progressed. Thus, generally, these valve devices are joined to the resin fuel tank by welding.

To prevent fuel contained in a fuel tank from backflowing into a fuel feed pipe, a backflow prevention valve is interposed between the fuel tank and the fuel feed pipe. As illustrated in, for example, FIGS. 7 and 8, the backflow prevention valve consists of a cover 100, a case 200, a valve 300, and a spring 400.

The cover 100 has an outer side portion 101 made of maleic acid modified polyethylene, and an inner side portion 102 made of polyamide. The cover 100 is formed by dichromatic molding. The cover 100 has a flange portion 103 and a cylindrical portion 104 protruding from a surface of the flange portion 103. A ring-like first welding portion 105 to be welded to the fuel tank is formed in a circumferential edge part of the flange portion 103. A ring-like second welding portion 106 to be welded to the case 200 is formed in the inner side portion 102 on the inner circumferential side of the first welding portion 105.

The case 200 is formed of polyamide which is hardly swelled by fuel. Three support plates 201 are radially protruded in the case 200 at circumferentially equal intervals. A cylindrical boss 202 including a through hole is connected to a leading end of each of the three support plates 201. A ring-like welding groove 203 to be welded to the second welding portion 106 is formed in an end part of the case 200. A ring-like seal projection 204 is formed in the other end part of the case 200.

A valve 300 is constituted by a valve body 301 formed of polyacetal, a ring-like rubber seal seat plate 302 made of polyacetal, a perforated disk-like holding plate 303, and a cap 304. A valve body 301 has a flange portion 305, a shaft portion 306 protruding from the center of the flange portion 305, and an inner cylindrical portion 307 protruding from the flange portion 305 in a direction opposite to the shaft portion 306. Three claw portions 308 are formed on the inner cylindrical portion 307 at circumferentially equal intervals. Each of the claw portions 308 can be radially elastically deformable due to slits (not shown) in both sides thereof in the inner cylindrical portion 307.

The valve body 301 is such that the inner cylindrical portion 307 is inserted through both a central hole of each of the seal seat 302 and the holding plate 303. Each of the claw portions 308 engages with the holding plate 303, so that the seal seat plate 302 is sandwiched between the flange portion 305 and the holding plate 303. The outside diameter of each of the seal seat plate 302 and the holding plate 303 is larger than that of the flange portion 305. A part of the seal seat plate 302 protrudes from the outer circumference of the flange portion 305.

This valve 300 is such that the shaft portion 306 is inserted into the through hole of the boss 202 from below, as viewed in FIG. 8, so that a spring 400 is passed through onto the shaft portion 306 passing through the through hole. Additionally, the cap 304 is fixed to and is fit onto the head part of the shaft portion 306. Consequently, the spring 400 is held in a state in which the spring 400 is compressed between the cap 304 and each of the three support plates 201. Also, the second welding portion 106 of the cover 100 is welded to the welding groove 203 of the case 200. The valve device is configured in this manner. Additionally, the valve device is assembled to the fuel tank by inserting the case 200 into the fuel tank from an opening portion formed therein and by welding the first welding portion 105 to the outer surface of the fuel tank.

In a state in which no external force acts upon this valve device, the valve 300 is pushed by the spring 400 in a direction in which the valve 300 approaches the cover 100. Thus, the part of the seal seat plate 302, which is protruded from the outer circumference of the flange portion 305, is pressure-contacted with the seal projection 204, so that the valve is sealed.

A valve described in, for example, JP-A-2004-028043 is known as a backflow prevention valve of such a kind.

However, it is necessary for the above-described conventional valve device that the seal seat plate is formed of an elastic material, such as rubber or thermoplastic elastomer. The conventional valve device has drawbacks in that the number of components of the valve itself is large, and that the number of steps of a process of assembling the valve device is large.

A valve device, in which a seal surface is formed integrally with a resin valve element itself, is described in, for example, JP-A-2006-123576. This valve device is configured to form a surface of a valve seat formed in a case and a seal surface of the valve element into spherical surfaces having substantially the same center of curvature, respectively, and to pressure-contact the seal surface of the valve element with the valve seat so that the touch area between the seal surface and the valve seat is large.

However, this valve device, which is configured so that both the case and the valve are formed of resins and are of a spherical seal surface structure having the same center of curvature, as described in JP-A-2006-123576, has a problem that even when fuel swelling is small, the position of the seal surface is displaced from a seal contact position at which the valve is sealed, so that the valve is not sealed.

SUMMARY OF THE INVENTION

The invention is accomplished in view of such circumstances. Accordingly, an object of the invention is to reduce the number of components of a valve or a fuel tank to which the valve is mounted, by eliminating the resin seal seat plate, and to assure sealability equal to that in the case of using the rubber seal seat.

To solve the above problems, according to the invention, there is provide a valve device for a fuel tank, which has a cover having a flange portion to be joined to an outer circumferential part of an operation portion formed in the fuel tank, a cylindrical case which is fixed to the cover and extends from the flange portion into the fuel tank, and a valve axially movably disposed in the case. The valve device features that the valve includes a resin valve body, a thin disk portion radially extending from the valve body, and a ring-like rib formed along an outer circumference of the disk portion, and the disk portion and the rib are formed integrally with the valve body, and the case includes a ring-like seal projection to be pressure-contacted with the disk portion to seal the valve.

Preferably, an end surface of the seal projection is a flat surface. Also, it is preferable that a ring-like groove is formed on the disk portion, and that the seal projection is pressure-contacted with a bottom surface of the groove to seal the valve.

According to the valve device of the invention, sealing thereof is achieved by pressure-contacting the seal projection of the case with the disk portion of the valve. The disk portion is set to be thin. When the seal projection is pressure-contacted with the disk portion, elastic deformation occurs in the disk portion, because the disk portion is thin. Even when the seal projection somewhat deforms due to fuel swelling, the sealability can be assured. Accordingly, high sealability can be achieved even when the resin components are pressure-contacted with each other. Additionally, even when the valve is inclined and sits on the seal projection, sealability can be ensured by elastic deformation.

Accordingly, while the high sealability is maintained, the use of the conventional rubber seal seat plate and the holding plate can be eliminated. Also, the number of components and the number of assembling man-hours can be reduced. Consequently, the cost of the device can be reduced.

A valve device according to the invention includes a cover, a case, and a valve. The cover is joined to an outer surface of a fuel tank. Preferably, the cover is joined to the outer surface of the fuel tank by welding. Desirably, the cover is formed of high-density polyethylene which can be welded to the fuel tank. Preferably, a gas barrier layer made of, for example, ethylene vinyl alcohol copolymer (EVOH) is formed on a surface of the cover, which is not joined to the fuel tank and is in contact with fuel.

The cover has a flange portion to be joined to the outer surface of the fuel tank.

The case accommodates the valve so that the valve can move axially. The case is formed of a resin, such as polyacetal or polyamide, which is hardly swelled by fuel. The case is held by the cover. The case and the cover are formed separately from each other. Subsequently, the case and the cover are integrated with each other. The case and the cover can be detachably integrated with each other by mechanical coupling mechanism, such as claw-coupling mechanism. Alternatively, the case and the cover can be integrated with each other by joining, such as welding.

The case has a ring-like seal projection to be pressure-contacted with the disk portion so as to seal the valve. An end surface of the seal projection can be either a curved surface or a flat surface. However, in a case where the end surface of the seal projection is a curved surface, and where when the feeding of fuel is stopped, the internal pressure of the tank increases, so that the disk portion is excessively pressure-contacted therewith, the touch area between the seal projection and the and the disk portion at the time of pressure-contacting the seal projection with the disk portion is large, as compared with the case where the end surface of the seal projection is a flat surface. Conversely, in the case where the end surface of the seal projection is a flat surface, a line contact part is liable to occur when the seal projection is pressure-contacted with the disk portion. Thus, the touch area therebetween is small, as compared with the case where the end surface of the seal projection is a curved surface. Therefore, in the case where the end surface of the seal projection is a flat surface, the surface pressure applied to the end surface at sealing of the valve is high, as compared with the case where the end surface of the seal projection is a curved surface. Consequently, the sealability can be further enhanced.

The valve is provided to be axially movable in the case. The shape and the material of the valve are not limited to specific shape and material. The valve can appropriately be designed according to the purpose of the valve. Additionally, a pushing member, such as a spring, for pushing the valve in a predetermined direction can be used.

The valve includes a resin valve body, a thin disk portion radially extending from the valve body, and a ring-like rib formed along an outer circumference of the disk portion. Preferably, the thickness of the disk portion varying with the material thereof is generally set to range from 0.3 mm to 1.5 mm. In a case where the thickness of the disk portion is less than 0.3 mm, the forming of the disk portion is difficult to achieve. Additionally, the disk portion does not satisfy necessary durability performance. Conversely, in a case where the thickness of the disk portion is more than 1.5 mm, the stiffness of the disk portion is so high that the elastic deformation thereof is difficult and that the sealability is reduced.

It is preferable for causing the elastic deformation of the disk portion that as illustrated in FIG. 3, the width (A) of the disk portion and the width (a) of the seal projection are set to meet the following inequality: A>2a. It is desirable that the width (A) of the disk portion and the width (a) of the seal projection are set to meet the following inequality: A>3a to make the seal projection sit at the center of the disk portion.

The rib reinforces the disk portion. The height and the thickness of the rib can be selected from various values.

Preferably, a ring-like groove is formed on the disk portion. Also, the seal projection is pressure-contacted with the bottom surface of the groove so as to seal the valve. Consequently, the valve device has a labyrinth structure to enhance the sealability still more.

Another aspect of the invention provides a fuel tank including:
a tank body having an opening;
a valve device mounted in the fuel tank, including
a cover having a flange portion to be jointed to an edge part of the opening of the tank body;
a cylindrical case fixed to a lower side of said flange portion of said cover; and
a valve axially movably disposed in said case including a resin valve body, a thin disk portion radially extending from said valve body, and a ring-like rib protruding along an outer circumference of said disk portion, and said disk portion and said rib are formed integrally with said valve body; and
a ring-like seal projection projecting from a lower end of the case to be pressure-contacted with said disk portion to seal said valve.

DETAILED DESCRIPTION OF THE PREFERRED EMBODIMENTS

Hereinafter, the invention is more specifically described by describing examples according to the invention and comparative examples.

Example 1

Figure 1:
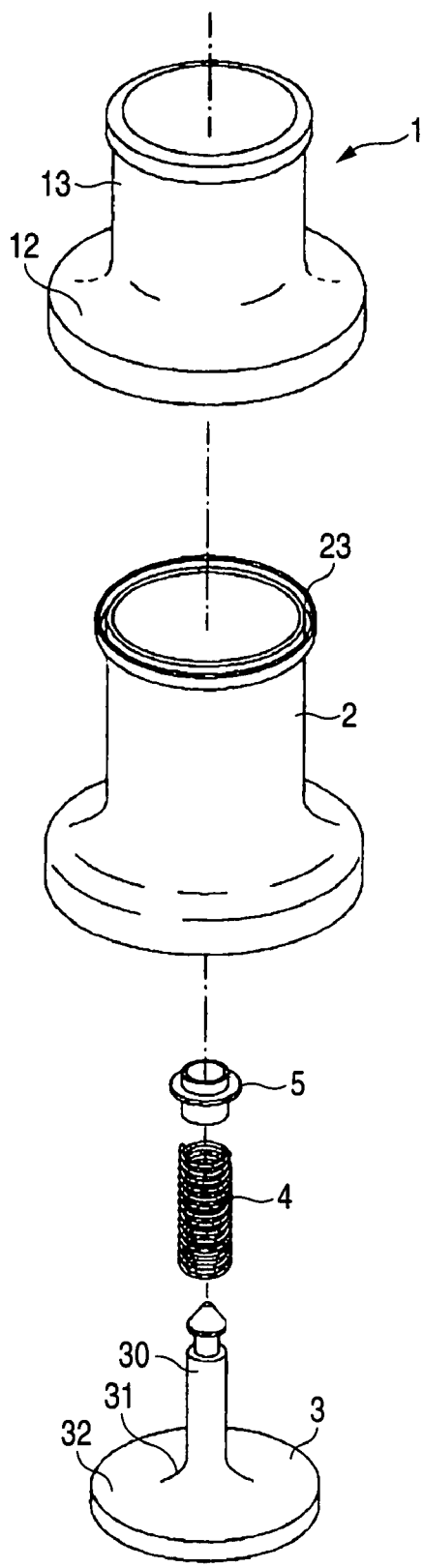
FIG. 1 is an exploded perspective view illustrating a valve device according to a first example of an embodiment of the invention.
Figure 2:
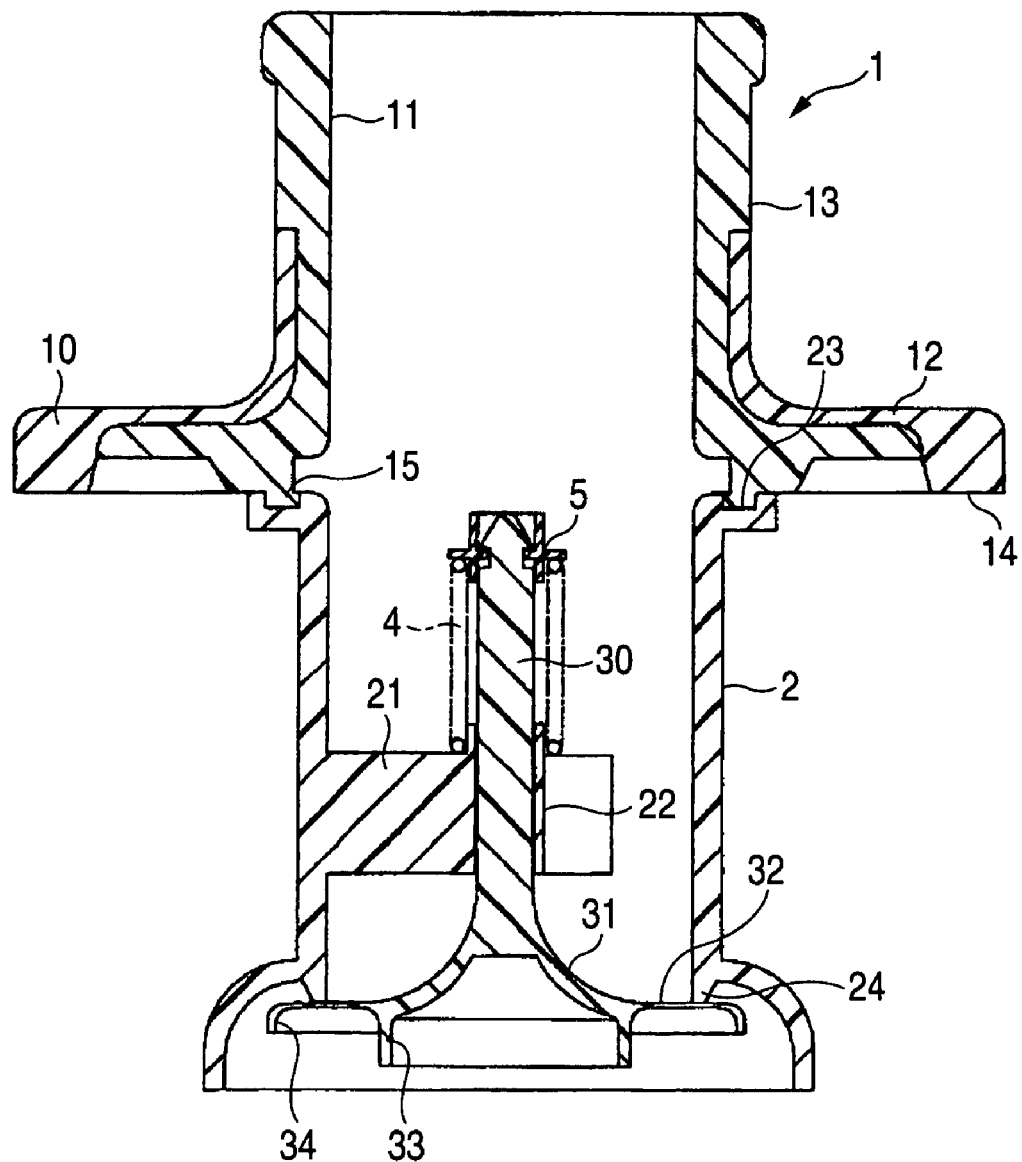
FIG. 2 is a cross-sectional view illustrating the valve device according to the first example of the embodiment of the invention.

FIG. 1 shows an exploded perspective view of a valve device according to a first example of the embodiment of the invention. FIG. 2 shows a cross-sectional view of the valve device according to the first example when assembled. This valve device is a backflow prevention valve and includes a cover 1, a case 2, a valve 3, a spring 4, and a cap 5. FIG. 2 illustrates a state in which the valve 3 is depressed against the pushing force of the spring 4.

The cover 1 has an outer side portion 10 made of maleic acid modified polyethylene, and an inner side portion 11 made of polyamide. The cover 1 is formed by dichromatic molding. Additionally, the cover 1 includes a flange portion 12, and a cylindrical portion 13 protruding from a surface of the flange portion 12. A ring-like first welding portion 14 is formed in a circumferential edge part of the flange portion 12 and is welded to an opening formed in a tank body (not-shown) of a fuel tank. In the examples of the invention, the tank body is made of resin containing high-density polyethylene (HDPE) as main component. A ring-like second welding portion 15 to be welded to the case 2 is formed in the inner side portion 11 on the inner circumferential side of the first welding portion 14.

The case 2 is formed of glass fiber reinforced polyamide which is hardly swelled by fuel. Three ribs 21 are radially protruded in the case 2 at circumferentially equal intervals. A cylindrical boss 22 including a through hole is connected to a leading end of each of the three ribs 21. A ring-like welding groove 23 to be welded to the second welding portion 15 is formed in an end part (upper end part) of the case 2. A ring-like seal projection 24 is formed in the other endpart (lower endpart) of the case 2. The seal projection 24 is made of the glass fiber reinforced polyamide and integrally formed with the case 2. An end surface of the seal projection 24 is a flat surface, as enlargedly illustrated in FIG. 3.

A valve 3 has a shaft portion (i.e., a valve body) 30 formed of polyacetal, a flange portion 31 formed at an end of the shaft portion 30, a disk portion 32 extending from a circumferential edge part of the flange portion 31 in the direction of an outer circumference thereof, an inner circumferential rib 33 which is formed at the inner circumferential end part of the disk portion 32 and protrudes in a direction opposite to the shaft portion 30. The shaft portion 30, the flange portion 31 and the rib 32 are integrally formed of polyacetal. The thickness of the disk portion 32 is 1.0 mm and is thin, as compared with the flange portion 31 whose thickness is 1.8 mm.

The disk portion 32 has a width (A) of 7.5 mm, while an end portion of the seal projection 24 has a thickness (a) of 2 mm. Thus, the widths A and a are set to meet the inequality: A>3a. The seal projection 24 sits at the center of the disk portion 32.

The valve 3 constituted in this manner is such that the shaft portion 30 is inserted into the through hole of the boss 22 from below, so that a spring 4 is passed through onto the shaft portion 30 passing through the through hole. Additionally, the cap 5 is fixed to and is fit onto the headpart of the shaft portion 30. Consequently, the spring 4 is held in a state in which the spring 4 is compressed between the cap 5 and each of the three ribs 21. That is, in a state in which no external force acts upon this valve device, the valve 3 is pushed by the spring 4 in a direction in which the valve 3 approaches the cover 1. Thus, the disk portion 32 is pressure-contacted with the seal projection 24, so that the valve is sealed.

According to the backflow prevention valve of the present example, first, the case 2, the valve 3, the spring 4, and the cap 5 are assembled to one another. Subsequently, the cover 1 and the case 2 are welded to each other to be integrated with each other. Subsequently, the first welding portion 14 of the flange portion 10 of the cover 1 is welded to the circumferential edge part of the opening portion. The cylindrical portion 13 of the cover 1 is press-fit into a fuel feed pipe and is fastened thereto from the outer circumference thereof by clamping.

When fuel is supplied, the valve 3 is pushed down by the pressure of the fuel against the pushing force of the spring 4. Thus, the sealing of the disk portion 32 and the seal projection 24 is released so as to enable the feeding of the fuel. When the level of the fuel is close to the full level, the disk portion 32 and the seal projection 24 are pressure-contacted with each other by being pushed by the spring 4, so that occurrence of backflow of the fuel into the case 2 is prevented.

Figure 3:
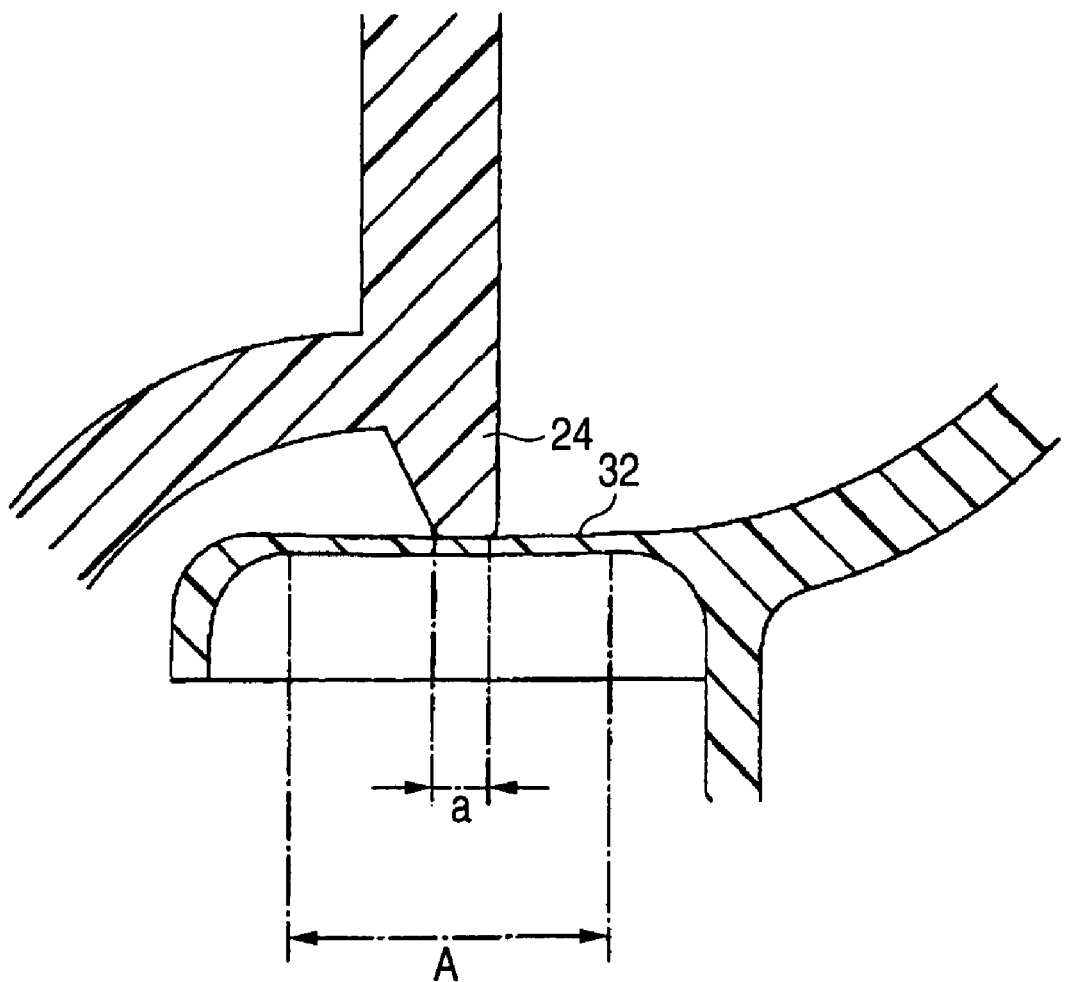
FIG. 3 is a primary part enlarged cross-sectional view illustrating the valve device according to the first example of the embodiment of the invention.
Figure 4:
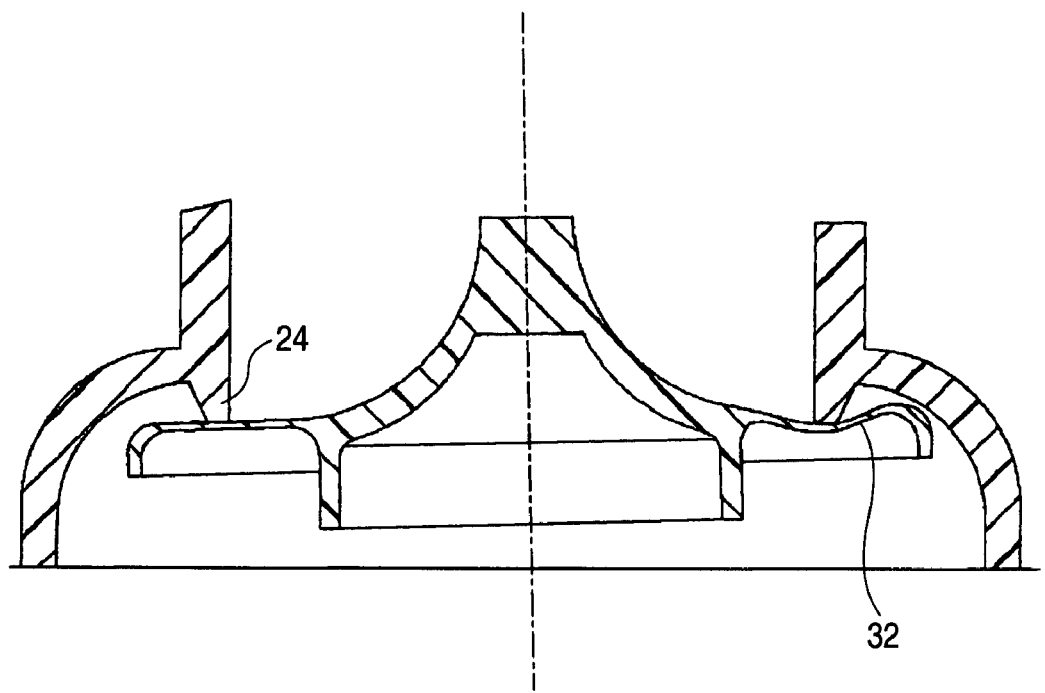
FIG. 4 is a primary part enlarged cross-sectional view illustrating an operation of the valve device according to the first example of the embodiment of the invention.

As enlargedly illustrated in FIG. 3, in the backflow prevention valve according to the present example, the end surface of the seal projection 24 is formed like a flat surface. When the valve is sealed, the seal projection 24 is pressure-contacted with the disk portion 32 similarly shaped like a flat surface. Accordingly, for example, in a case where the projection 24 is pressure-contacted with the disk portion 32 in a state in which the valve 3 is slightly inclined, the disk portion 32 is elastically deformed, as illustrated in FIG. 4, so that the valve can be sealed.

Conversely, when the feeding of the fuel is stopped, the internal pressure of the tank is increased. When the disk portion 32 and the seal projection 24 are excessively pressure-contacted with each other, the disk portion 32 is apt to deform along the end surface of the seal projection 24. Thus, the touch area between the seal projection 24 and the disk portion 32 is large, as compared with the case where the end surface of the seal projection 24 is a flat surface.

That is, preferably, the end surface of the seal projection 24 is shaped like a flat surface. However, even in a case where the end surface of the seal projection 24 is shaped like a curved surface, the problems to be solved by the invention can be solved.

Figure 5:
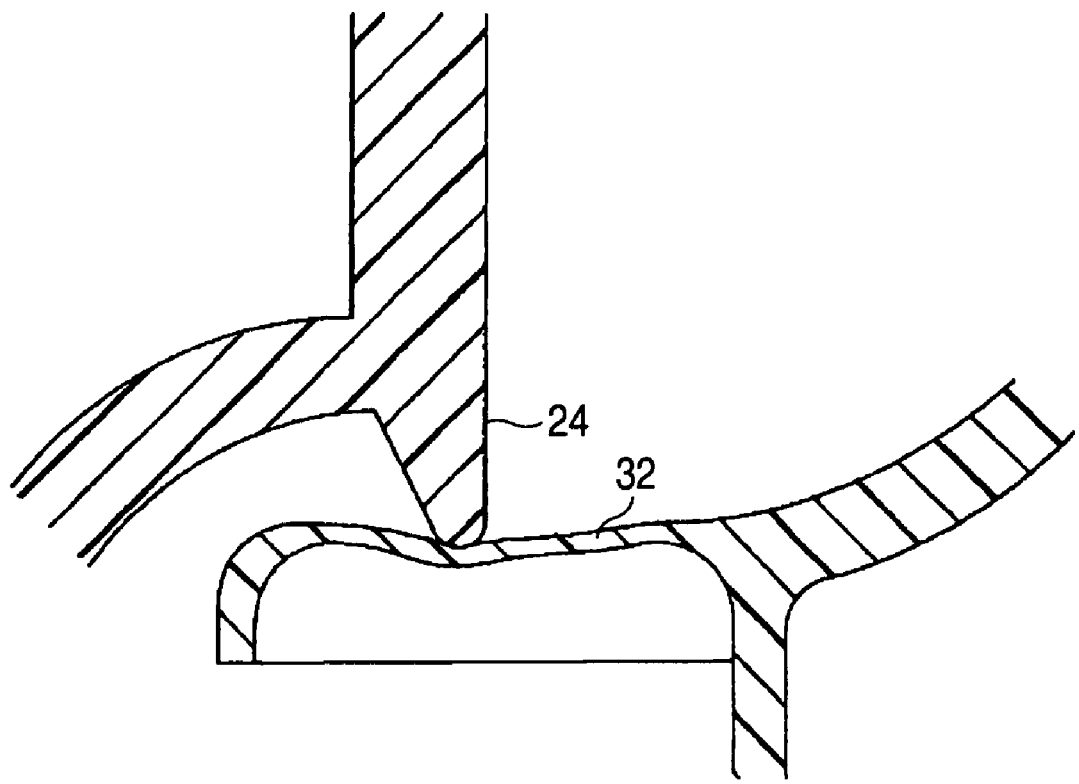
FIG. 5 is a primary part enlarged cross-sectional view illustrating a modification of the valve device according to the first example of the embodiment of the invention and also illustrating an operation of this example thereof.

The disk portion 32 is 1.0 mm in thickness and is thin. Accordingly, when fuel swelling occurs, so that the end surface of the seal projection 24 or the disk portion 32 is slightly deformable, the sealability can be assured by the elastic deformation of the disk portion 32 as shown in FIG. 5, which is caused by pressure-contacting the seal projection 24 therewith. The sufficient flatness of the disk portion 32 with respect to the seal projection 24 can be ensured by the inner circumferential rib 33 and the outer circumferential rib 34. Consequently, the disk portion 32 can be prevented from being excessively deformed. Due to the synergic action of these factors, the valve device according to the present example can achieve high sealability.

Example 2

Figure 6:
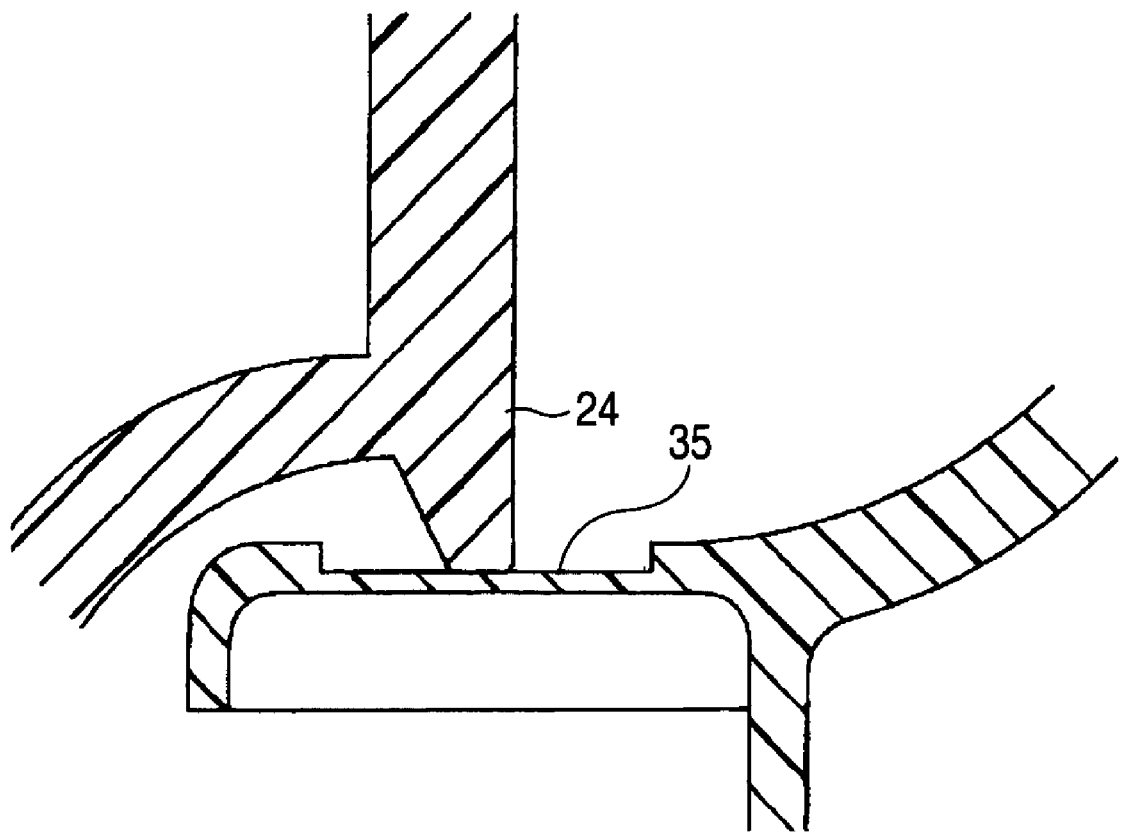
FIG. 6 is a primary part enlarged cross-sectional view illustrating a valve device according to a second example of the embodiment of the invention.
Figure 7:
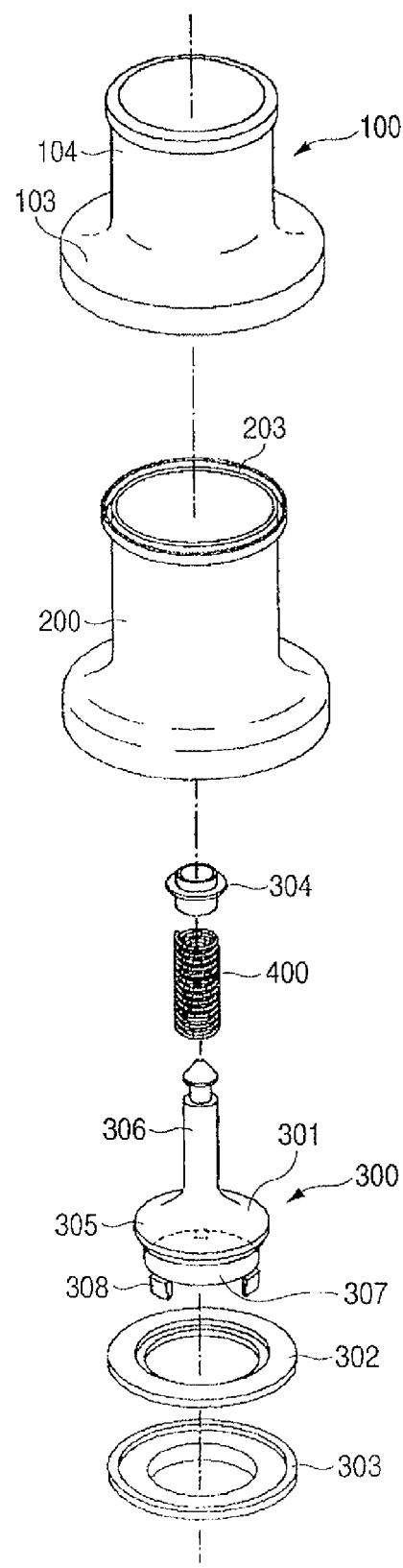
FIG. 7 is an exploded perspective view illustrating a conventional backflow prevention valve.
Figure 8:
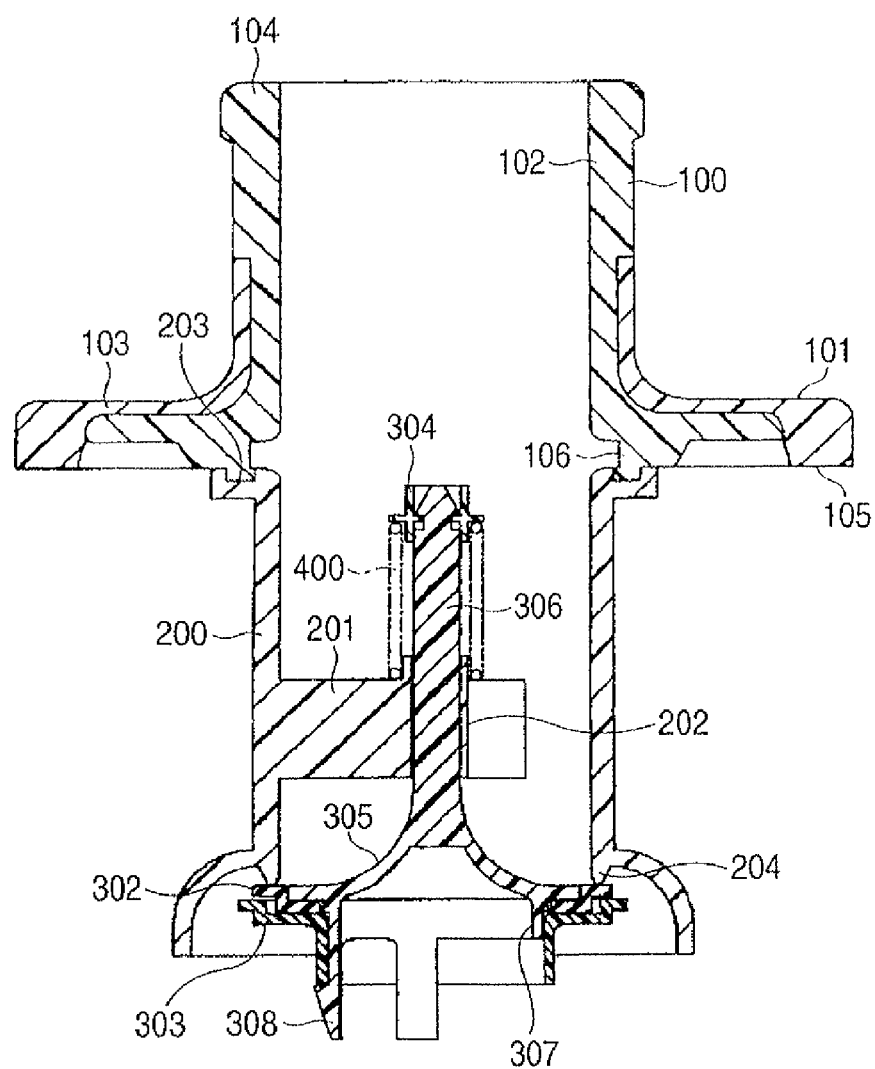
FIG. 8 is a cross-sectional view illustrating the conventional backflow prevention valve.

FIG. 6 illustrates a valve device according to the present example of the embodiment. This valve device is similar to the Example 1 except for the shape of a disk portion 32.

A ring-like groove 35 is formed on a surface of the disk portion 32, which is provided at the side of the shaft portion 30. The depth of the groove 35 is set to be in a range of 0.1 to 0.2 mm. The thickness of the groove 35 is set to be about 0.8 mm. A seal projection 24 is pressure-contacted with the groove 35 to seal the valve.

According to the valve device of the present example, the seal projection 24 and the groove 35 constitute a labyrinth structure. Consequently, the sealability can be further enhanced.

Devices, to which the vale device according to the invention is applied, are not limited to the backflow prevention valve. The vale device according to the invention can be utilized for a full tank detection valve, and to flow control valves for breather circuits or for evaporator circuits.

What is claimed is:

1. A valve device adapted to be mounted in a fuel tank, comprising:
   a cover having a flange portion jointed to an edge part with a first welding portion for being welded to an opening formed in said fuel tank;
   a cylindrical case fixed to a lower side of said flange portion of said cover; and
   a valve axially movably disposed in said case including a shaft portion made of resin, a thin disk portion radially extending from said shaft portion, and a rib portion including a ring like inner rib protruding along an inner circumference of said disk portion and a ring like outer rib protruding along an outer circumference of said disk portion, said disk portion, said inner rib, and said outer rib being formed monolithically with said shaft portion; and
   a ring-like seal projection projecting from a lower end of the case to be pressure-contacted with said disk portion to seal said valve, wherein
   the inner rib and the outer rib are protruded in an opposite direction to the shaft portion, and
   the ring-like seal projection is brought into contact with the disk portion provided between the inner rib and the outer rib so that the sufficient flatness of the disk portion can be ensured by the inner rib and the outer rib.

2. The valve device for a fuel tank according to claim 1, wherein
   an end surface of said seal projection is a flat surface.

3. The valve device for a fuel tank according to claim 1, wherein
   said case and said sealing projection are integrally made of glass fiber reinforced polyamide.

4. The valve device for a fuel tank according to claim 3, wherein
   said cover is formed by dichromatic molding including an outer portion made of maleic acid modified polyethylene and an inner portion made of polyamide.

5. The valve device for a fuel tank according to claim 1, wherein
   a width A of the disk portion and a width a of the seal projection are set to meet A>2a.

6. The valve device for a fuel tank according to claim 1, wherein
   the width A of the disk portion and the width a of the seal projection are set to meet A>3a.

7. The valve device for a fuel tank according to claim 1, wherein
   a ring-like welding groove is formed in an upper end part of the case, and
   the ring-like welding groove is welded to a second welding portion in the cover.

8. The valve device for a fuel tank according to claim 1, wherein
   the valve includes the shaft portion inserted into a through hole of a boss,
   a spring is passed through onto the shaft portion, and
   a cap is fixed to a head part of the shaft portion.

9. The valve device for a fuel tank according to claim 8, wherein
   the valve further includes a valve flange portion formed at an end of the shaft portion, the valve flange portion connecting the shaft portion and the disk portion, and
   the shaft portion, the valve flange portion and the rib portion are monolithically formed of polyacetal.

10. The valve device for a fuel tank according to claim 8, wherein
    three side ribs radially protrude from the case at circumferentially equal intervals,
    the boss, including the through hole, is connected to a leading end of each of the three side ribs; and
    the spring is held in a state in which the spring is compressed between the cap and each of the three side ribs.

11. The valve device for a fuel tank according to claim 1, wherein
    a thickness of the disk portion is 1.0 mm, and
    an end surface of said seal projection is a curved surface.

12. The valve device for a fuel tank according to claim 1, wherein
    the disc portion is elastically deformable, and
    said seal projection is pressure-contacted with the disc portion to seal said valve.

13. The valve device for a fuel tank according to claim 12, wherein
    an end surface of said seal projection is a flat surface.

14. The valve device for a fuel tank according to claim 12, wherein
    an end surface of said seal projection is a curved surface.

15. A valve device adapted to be mounted in a fuel tank comprising:
    a cover having a flange portion jointed to an edge part with a first welding portion for being welded to an opening formed in said fuel tank;
    a cylindrical case fixed to a lower side of said flange portion of said cover; and
    a valve axially movably disposed in said case including a shaft portion made of resin, a thin disk portion radially extending from said shaft portion, and a rib portion including a ring like inner rib protruding along an inner circumference of said disk portion and a ring like outer rib protruding along an outer circumference of said disk portion, said disk portion, said inner rib, and said outer rib being formed monolithically with said shaft portion; and
    a ring-like seal projection projecting from a lower end of the case to be pressure-contacted with said disk portion to seal said valve, wherein
    the inner rib and the outer rib are protruded in an opposite direction to the shaft portion,
    a ring-like groove is formed on an upper surface of said disk portion, and
    said seal projection is pressure-contacted with a bottom surface of said groove to seal said valve.

16. The valve device for a fuel tank according to claim 15, wherein
    an end surface of said seal projection is a flat surface.

17. The valve device for a fuel tank according to claim 15, wherein said case and said sealing projection are integrally made of glass fiber reinforced polyamide.

18. The valve device for a fuel tank according to claim 17, wherein
said cover is formed by dichromatic molding including an outer portion made of maleic acid modified polyethylene and an inner portion made of polyamide.

19. The valve device for a fuel tank according to claim 15, wherein
a width A of the disk portion and a width a of the seal projection are set to meet A>2a.

20. The valve device for a fuel tank according to claim 15, wherein the width A of the disk portion and the width a of the seal projection are set to meet A>3a.

21. The valve device for a fuel tank according to claim 15, wherein
a ring-like welding groove is formed in an upper end part of the case, and
the ring-like welding groove is welded to a second welding portion in the cover.

22. The valve device for a fuel tank according to claim 21, wherein
the valve further includes a valve flange portion formed at an end of the shaft portion, the valve flange portion connecting the shaft portion and the disk portion, and
the shaft portion, the valve flange portion and the rib portion are monolithically formed of polyacetal.

23. The valve device for a fuel tank according to claim 15, wherein
the valve includes the shaft portion inserted into a through hole of a boss,
a spring is passed through onto the shaft portion, and
a cap is fixed to a head part of the shaft portion.

* * * * *